United States Patent [19]
Mui

[11] Patent Number: 5,806,315
[45] Date of Patent: Sep. 15, 1998

[54] INTERNAL COMBUSTION ENGINE

[76] Inventor: Richard Chin Pang Mui, 39, Jalan Rajah, #08-41, Fortuna Court, Singapore 1232, Singapore

[21] Appl. No.: 954,009

[22] Filed: Oct. 20, 1997

Related U.S. Application Data

[63] Continuation of Ser. No. 436,293, Jul. 10, 1995, abandoned.

[30] Foreign Application Priority Data

Nov. 16, 1992 [GB] United Kingdom .................... 9223990
Apr. 28, 1993 [GB] United Kingdom .................... 9308811

[51] Int. Cl.$^6$ ....................................................... F02G 3/02
[52] U.S. Cl. ............................................. 60/614; 60/623
[58] Field of Search ............................. 60/620, 621, 622, 60/623, 624, 614

[56] References Cited

U.S. PATENT DOCUMENTS

| | | |
|---|---|---|
| 3,807,168 | 4/1974 | Bachmann ................................ 60/624 |
| 3,808,818 | 5/1974 | Cataldo .................................... 60/620 |
| 3,903,854 | 9/1975 | Shelton . | 
| 3,928,971 | 12/1975 | Spath ........................................ 60/624 |
| 4,019,324 | 4/1977 | Coxon ...................................... 60/624 |
| 4,452,043 | 6/1984 | Wallace . |
| 4,843,821 | 7/1989 | Paul et al. . |
| 4,998,525 | 3/1991 | Eftink . |
| 5,085,179 | 2/1992 | Faulkner . |
| 5,111,783 | 5/1992 | Moore . |

FOREIGN PATENT DOCUMENTS

| | | |
|---|---|---|
| 2547208 | 4/1977 | Germany ................................. 60/623 |
| 2723153 | 5/1977 | Germany . |
| 262577 | 12/1977 | Germany ................................. 60/623 |
| 2724474 | 12/1978 | Germany ................................. 60/623 |
| 0170691 | 2/1921 | United Kingdom . |
| 0250095 | 1/1926 | United Kingdom . |
| 0253170 | 1/1926 | United Kingdom . |
| 0578468 | 6/1946 | United Kingdom . |
| 0699176 | 4/1950 | United Kingdom . |
| 2043782 | 12/1980 | United Kingdom . |
| 2062748 | 3/1981 | United Kingdom . |
| 2218467 | 2/1989 | United Kingdom . |
| 9202719 | 2/1992 | WIPO . |

*Primary Examiner*—Michael Koczo
*Attorney, Agent, or Firm*—Ostrolenk, Faber, Gerb & Soffen, LLP

[57] ABSTRACT

An engine comprises a rotary unit (1) and a reciprocating unit (3) coupled to a common drive (7). A first rotary unit (1) provides the induction phase of the 4-stroke cycle and passes air to the reciprocating unit for the compression and combustion phases. The exhaust gases are passed to a second rotary unit (5) having an afterburner for the exhaust phase. Alternatively, two rotary units and two reciprocating units each having two pistons may be arranged alternately. The invention may also be utilized for improved 2-stroke engines making one power pulse per stroke.

15 Claims, 5 Drawing Sheets

INTERNAL COMBUSTION ENGINE

This is a continuation of Application Ser. No. 08/436,293 filed on Jul. 10, 1995, abandoned.

The present invention relates to an engine, more especially an engine of the internal combustion type.

Most internal combustion engines, particularly for use in motor vehicles, are of the reciprocating type, ie. where a piston is arranged to execute a reciprocating motion within a cylinder. Another kind of internal combustion engine which has sometimes been employed is the rotary engine, wherein a specially shaped rotor is arranged inside a "cylinder" or drum.

A completely new type of engine has now been devised in accordance with a first aspect of the present invention, which provides an internal combustion engine comprising a rotary unit and a reciprocating unit respectively coupled to a common drive, the rotary unit being downstream of an exhaust of the reciprocating unit and provided with afterburner means for control of final exhaust emissions. The applicant has coined the convenient term 'binary engine' for an engine of this new kind.

Preferably, the common drive is a camshaft or crankshaft, although any kind of common drive linking the reciprocating and rotary unit may be used.

Preferably also, the engine comprises at least one further rotary unit, which may be connected with its outlet or outlets to the intake side of the reciprocating unit. Where there is only one rotary unit, it may have its inlet or inlets connected to the output (exhaust side) of the reciprocating unit.

According to preferred embodiments described below, ducting is provided to pass gas between the rotary unit or units and the reciprocating unit. In a first of these embodiments, a first rotary unit is arranged to pass intake air to the reciprocating unit and a second rotary unit is arranged to receive exhaust gas from the reciprocating unit. In this arrangement, combustion apart from afterburning is arranged to occur, during use, only in the reciprocating unit.

In a second embodiment, a pair of reciprocating units are arranged alternately with a pair of rotary units along a common drive. However, three or more reciprocating units could be arranged alternately with rotary units. Preferably, each of these reciprocating units has a pair of in-line pistons/cylinders.

The cylinders of the reciprocating unit may be in any convenient arrangement, for example in-line, V formation, flat (boxer) or radial. However, radial formation, especially wherein three cylinders are used, is most preferred. The reciprocating unit may be 4-stroke or 2-stroke (i.e. making one power pulse per stroke).

A second aspect of the invention provides a trap valve for an engine, the trap valve comprising a pair of valve members each attached to a respective valve stem, the valve stems being coaxial and slidable relative to each other, the valve members being positioned to close on respective upper and lower valve seats either side of an orifice.

Depending on the exact configuration, engines according to the present invention provide one or more advantages over conventional arrangements. Such advantages include high torque, high power output (horsepower) and low noise, reduced environmental pollution, fuel economy and reduction in the weight of, or even elimination of an associated flywheel. Engines according to the present invention are suitable in a wide range of applications, for example as motive units in automobiles, marine vessels, aircraft, as well as providing mechanical power in industrial manufacturing environments.

For the avoidance of doubt, in the context of the present disclosure, the term "reciprocating unit" refers to a unit having a general construction of a reciprocating internal combustion engine, whether or not the reciprocating unit is actually in operation.

The present invention will now be explained in more detail by reference to the following non-limiting embodiment and with reference to the accompanying drawings in which.

Figures 1A, 1B:
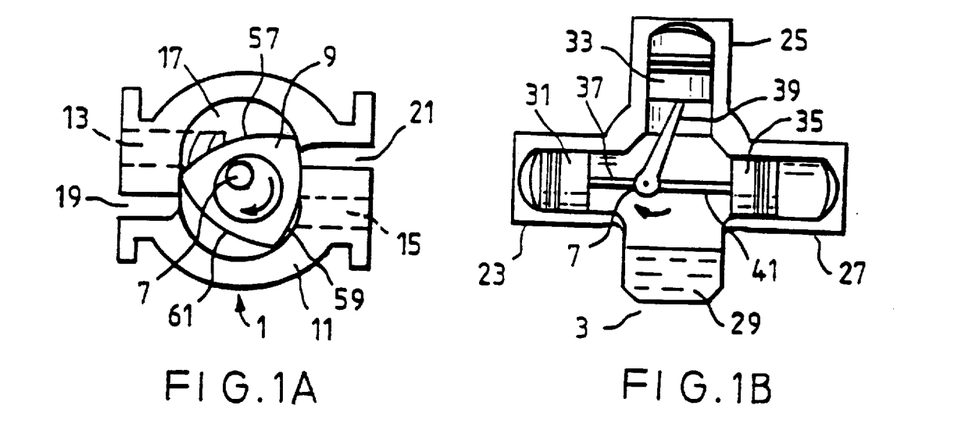
FIGS. 1A–1C show a segmented radial cross-section of a first embodiment of an engine according to the present invention.
Figure 1C:
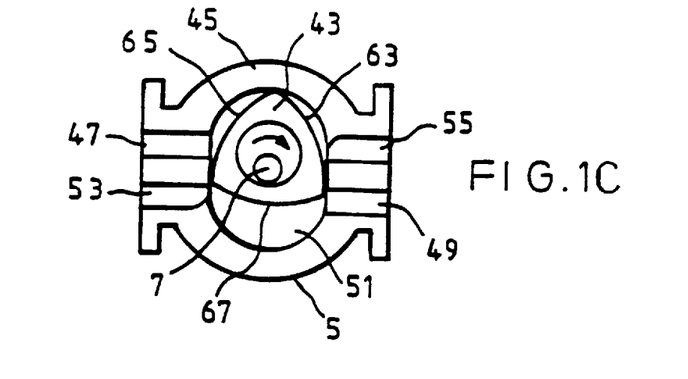

As shown in FIGS. 1A–1C, a first embodiment of an internal combustion engine according to the present invention comprises a first rotary unit 1 (FIG. 1A), a reciprocating unit 3 (FIG. 1B) and a second rotary unit 5 (FIG. 1C). To facilitate an explanation of how these units each function in terms of operation of the engine as a whole, they are shown side-by-side in the drawing. However, in practice, the first rotary unit 1 would be situated behind the reciprocating unit 3 and the second rotary unit 5 would be in front of the reciprocating unit, or of course the reverse configuration.

The units are linked by a common camshaft 7. They may be machined in a single engine block or joined as separate units with appropriate camshaft seals with or without differential gearings therebetween.

The two rotary units are substantially of the conventional Wankel type. The first rotary unit 1 thus has a rotor 9 in a housing 11. The housing 11 is provided with a pair of air inlets 13, 15 communicating with substantially opposite sides of the rotary "cylinder" 17.

The housing is also provided with a pair of air outlets 19, 21 also communicating respectively with said substantially opposite sides of the cylinder 17 but spaced apart from the air inlets 13, 15. The two outlets 19, 21 communicate with the cylinders 23, 25, 27 of the reciprocating unit via internal ducts (not shown).

The three cylinders 23, 25, 27 of the reciprocating unit are arranged in a radial T arrangement above an oil sump 29 and contain respective pistons 31, 33 35 connected by respective connecting rods 37, 39, 41 to the camshaft 7. The cylinders 23, 25, 27 of the reciprocating unit are connected via exhaust valves partly of conventional kind but with integral secondary trap valves (FIG. 2) and ducting (not shown) to the second rotary unit 5. It is preferred for this ducting to be formed in an integral engine block to reduce possible thermal volume losses.

Like the first rotary unit 1, the second rotary unit 5 similarly has a rotor 43 in a housing 45. The housing 45 is provided with a pair of exhaust gas inlets 47, 49 communicating with substantially opposite sides of the rotary "cylinder" 51.

Again with similarity to the first rotary unit 1, the housing 45 of the second rotary unit 5 has a pair of exhaust outlets 53, 55. These outlets communicate respectively with the aforementioned opposite sides of the cylinder 51 but are spaced apart from the exhaust gas inlets 47, 49. The exhaust outlets 53, 55 may be coupled in use to an exhaust manifold of conventional type but obviously, configured to the particular engine configuration.

Thus, it will be appreciated that the first rotary unit 1 and second rotary unit 5 are generally similar. However, the three flanks 57, 59, 61 of the rotor 9 of the first unit 1 are completely smooth to avoid seepage. On the other hand, the three flanks 63, 65, 67 of the rotor 43 of the second unit 5 are provided with recesses (not shown) to withstand the very high pressures occurring in this second unit during use. In the second rotary unit, these recesses provide controlled inlet orifices, eg. for injection of liquid or gaseous substances to help neutralise unburned fuel or toxic gases. The recesses in the first rotary unit may also be provided with such controlled inlet orifices. The recesses may accommodate electronic sensors.

Yet again, the rotor and/or cylinder may be provided with linings of "catalytic" materials such as platinum, to help eliminate unburned fuel or toxic gases.

The inlet manifold of the engine is of conventional type with throttle mechanism and an adjustable wastegate. Only the cylinders of the radial unit 3 are provided with spark plugs (not shown) as combustion does not. occur in the rotary units. In view of the high compression ratios occurring in the cylinders of the radial (reciprocating) unit, direct fuel injection is preferred. Cooling is conveniently effected by the conventional pumped water system.

Figure 2:
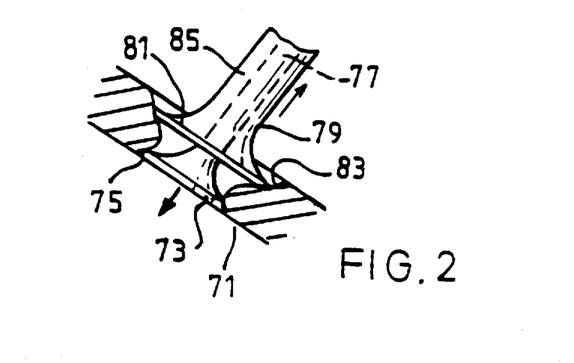
FIG. 2 shows an axial cross-section of a first trap valve for use in the engine according to FIG. 1 at the exhaust ports of the reciprocating unit.

FIG. 2 shows the construction of one of the exhaust valves 71 of the reciprocating unit 3. A conventional type of valve head 73 is seated (when in the closed position) on a valve seat 75. The valve head 73 is integral with a shaft 77 which runs coaxially inside a hollow support tube 79 and which terminates in a secondary trap valve head 81. In the closed position the trap valve head abuts a rear face 83 of the valve seat 75. The main and secondary valve heads are spring loaded in sleeving 85.

The operation of this engine according to this embodiment of the invention will now be explained with reference to FIG. 1. It involves the normal elements of the 4-stroke cycle, namely induction, compression, combustion and exhaust. However, unlike with a conventional reciprocating engine, these are not all effected in the cylinders 23, 25, 27 of the reciprocating unit 3.

Induction is effected in the first rotary unit 1 but the compressed air-fuel mixture is compressed and burned sequentially in the cylinders 23, 25, 27 of the reciprocating unit 3. The exhaust gases are transferred to the second rotary unit 5 where additional liquid or gaseous substances are added to help neutralise unburned fuel or toxic gases and the last phase of the 4-stroke cycle, namely exhaust expulsion occurs.

The first (induction) rotary 1 is provided with internal gearing and gives excellent capability for pressurising the injected air into the reciprocating unit 3 at the end of the usual compression/combustion phases, at both upper and lower sections of the rotor revolution. Ingestion at each successive section starts even before the preceding one finishes on the opposite side of the "cylinder". Therefore, with this operation there are 4 ingestions to 3 intake actions, in an overlapping manner timewise. This provides a substantially constant flow of continuous boosted air supply to the reciprocating unit 3 to achieve a high compression ratio, even at low or idle engine speeds. However, the compression ratio increases with increasing engine speed.

After combustion, which only occurs in the reciprocating unit 3, the fast expanding and hot exhaust gases are force-fed into the second rotary unit 5 immediately upon leaving the exhaust valves of the reciprocating unit 3. The integral secondary trap valves prevent the expanded gas from pressuring the exhaust valve back inwardly of the cylinder.

In the exhaust phase, the sweep of the rotor 43 of the second rotary unit 5 is further energised by the incredibly high pressured exhaust gases. This action will contribute a significant amount of power to the crankshaft. Between these two exhaust phases, more if not most of the unburnt fuel or other undesirable gases may eliminate and may even render use of an external catalytic converter totally unnecessary.

The gearing for the number of action strokes may be coordinated with the number of cylinders or combustion timing to optimise smooth operation, or may be otherwise arranged as desired.

FIGS. 3–6 show various operating modes of a second embodiment of a binary engine according to the present invention, which engine has been designed with the aim of improving cleanliness. The design features some unconventional features which have never been used previously in the construction of engines.

This new engine is unlike any conventional compound engine which can only provide a marginal increase in performance. This engine will change perceptions of compound power units. It is compact, economical, powerful, reliable, capable of using different fuel types and has a capacity for varying displacement. It can also include an auxilliary power unit all the same basic binary engine. These different modes of operation are switchable during engine operation by automatic (e.g. microprocessor) or manual control.

In this embodiment, as illustrated, an engine 101, two pairs of respective opposing reciprocating units 103,105 (161,165) each having two pistons (107,109 and 111,113 respectively) are each alternately arranged between a pair of rotary units 115,117 (163,167) arranged along a common driveshaft 119. Thus, there is a total of 4 reciprocating pistons and two rotors 121,123. Of course, alternative reciprocating arrangements and combinations thereof are possible such as "V" or radial configurations, as well as other opposing piston arrangements and other similar types with more than 4 each of reciprocating units and rotors.

The engine of this second embodiment is a four stroke engine and the main power output is from the reciprocating pistons. The fuel is petrol (diesel and other types are also possible).

Figure 3:
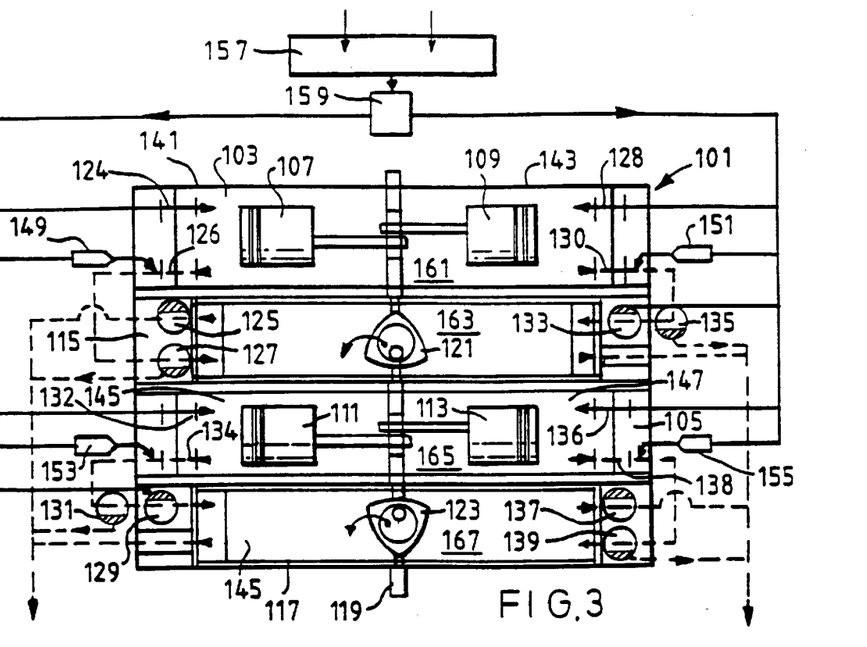
FIG. 3 shows a diagramatic view of an engine according to a second embodiment of the present invention, operating in a first mode.

The exhaust outlets of the reciprocating units 161,165 are provided with respective exhaust trap valves 126,130 and 134, 138. The outlets of reciprocating unit 105 are also provided with respective trap valves 132,134 and 136, 138.

Two pairs of inlet rotary valves 125,127 and 129,131 respectively, are arranged in the engine heads of the rotary units. Two pairs of rotary valves 133,135 and 137,139 are also arranged respectively at the outlet ports of the rotary units.

Multiple inlet and outlet valves per cylinder may be used if appropriate. The working method of these valves can be of any types, e.g. mechanical, hydraulic or electronic systems, whatever is most suited to the application requirements. The main function of the trap valves in the inlets is to open and shut to allow or inhibit flow of air or air/fuel mixtures to the reciprocating pistons for combustion. It is also possible for each of these inlet valves to be individually controlled and have different valve lift timings by varied cam lobe profiles if two or more inlet valves are used per cylinder. Such functions are of upmost importance to allow a very wide variety of unique operating modes that only such a binary engine can perform. In actual operation, the trap valves work simultaneously with the rotary valves of the exhaust rotors to switch to whichever mode is desired. This may be done automatically by microprocessor control.

The other trap valves at the exhaust ports work by virtue of the pressure of incident gas and a weak return spring is provided to prevent back pressures after exhaust from the afterburning action. No other controls are needed. The ability to shut down or fire up any number of cylinders or rotors enables such an engine to replace a conventional larger engine without compromising on power output.

As in conventional compound engines, the exhaust gases are ducted to perform some task, the exhaust rotors of this binary engine are different because they increase output much more and and also fulfil other novel functions.

Each of the cylinders of the reciprocating units (141,143 and 145,147 respectively) is provided with a respective air injector 149,151 and 153,155. Inlet flow is indicated by solid lines and exhaust flow by broken lines.

During the complete exhaust phase of the reciprocating units, the respective air jet 149,151 and 153,155 mounted after the exhaust port injects fresh air continuously. This results in the exhaust gas being oxidised during transition in the internal ducting to diminish the three best known exhaust gas pollutants, namely, hydrocarbons, carbon monoxide and oxides of nitrogen. In this particular state hydrocarbons are converted to water, carbon monoxide to carbon dioxide and oxides of nitrogen to ammonia. While conversion of the hydrocarbons and carbon monoxide is easier to effect, oxides of nitrogen may be re-converted because of the rapidly decreasing temperatures between the instant of ignition and moment of oxidation, and because the presence of excessive oxygen. Towards the end of the exhaust phase the rotor tips should preferably be approaching the top/bottom dead centre or TDC/BDC in the rotor housing. Situated just half way between TDC and BDC is a fuel jet and slightly after it, a spark plug. A small amount of hydrogen fuel is injected into the exhaust mixture which is subsequently ignited by the spark plug. Another method of hydrogen fuel delivery is by injection through a quick-mix or pre-mix chamber located at the normal intake port position on the side wall opening of the rotor housing.

The resulting explosion results in greater pressure being applied against the rotor especially at the tip, so that a great amount of energy and power is transferred to the crankshaft 119. In this afterburning phase there is a marked rise in temperature of the gases. This high temperature and consumption of the remaining oxygen ensures that the ammonia remains and not very much re-converted to oxides of nitrogen. This action only occurs when exhaust gas is in the rotary unit and not otherwise. The emission quality of this engine is far cleaner than any previously known. However, in the case where absolute assurance of cleanliness is required then a catalytic convertor can also be fitted. Yet again, as for the first embodiment, at least one of the rotary units could be provided with a catalytic lining.

There are four modes of operation, herein referred to respectively as modes "A"–"D".

The basic engine layout is depicted in each of FIGS. 3 to 6. This binary engine has either a rotary, super or turbo charger as the air supply unit 157. A rotary compressor is preferred. Air is then passed into a plenum chamber via a wastegate 159 for regulating the pressure, although forced induction may not be necessary. Mode "A" illustrated in FIG. 3 is the normal operation mode where four reciprocating pistons of the two reciprocating units are functioning with the two rotary units. All the trap valves are in the open position and rotary valves are also open for this mode of operation.

This mode is preferred for heavy loading, acceleration or high speed operation. The afterburners in use and smooth delivery or pure power.

Figure 4:
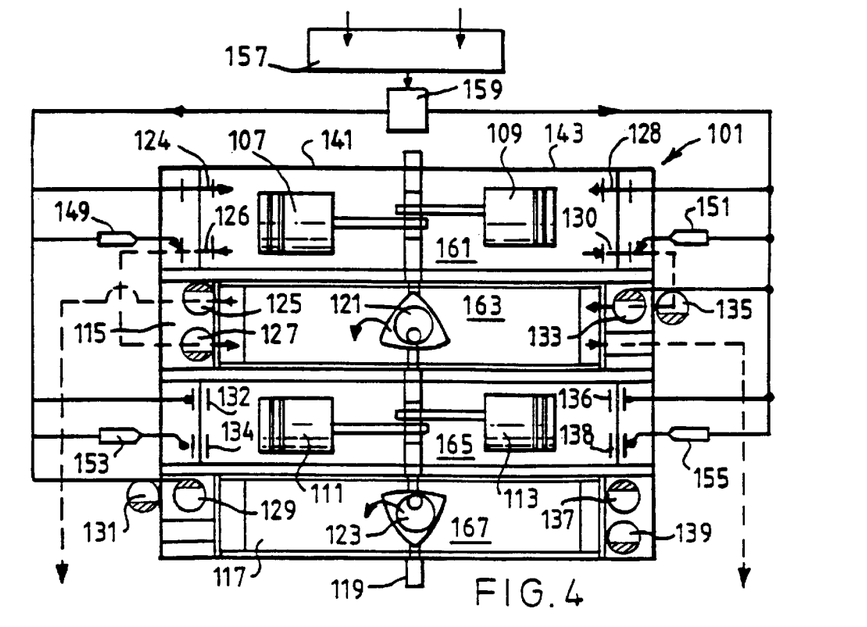
FIG. 4 shows the engine of FIG. 3 operating in a second mode.

Mode B is explained in FIG. 4. During engine operation and in predetermined rpm ranges or with lighter loads, the engine switches to mode "B" automatically. This ensures economical operation of this engine.

It should be noted that these functions are shown in first reciprocating unit 161 and first rotary unit 163 in the drawing. At the same time, the trap valves in the second reciprocating unit 165 are closed, and those in second rotary unit 167 are idling.

For clarity it should be noted that first reciprocating unit 161 is that containing pistons 107,109. First rotary unit 163 contains rotor 121. Second rotary unit 167 contains rotor 123 and the second reciprocating unit contains pistons 111,113. Fuel supply into the idling pairs is shut off in this mode.

Of course, for even wear and tear, the microprocessor can be programmed to switch between first units 161,163 or second units 165,167. Putting any of these units into "rest" mode is most appropriate when cruising long stretches, decelerating or with downhill engine braking (in the case of an automobile).

When more power is demanded or a higher load detected, the automatically switches back to "A" mode or to a higher mode (Mode "D").

Figure 5:
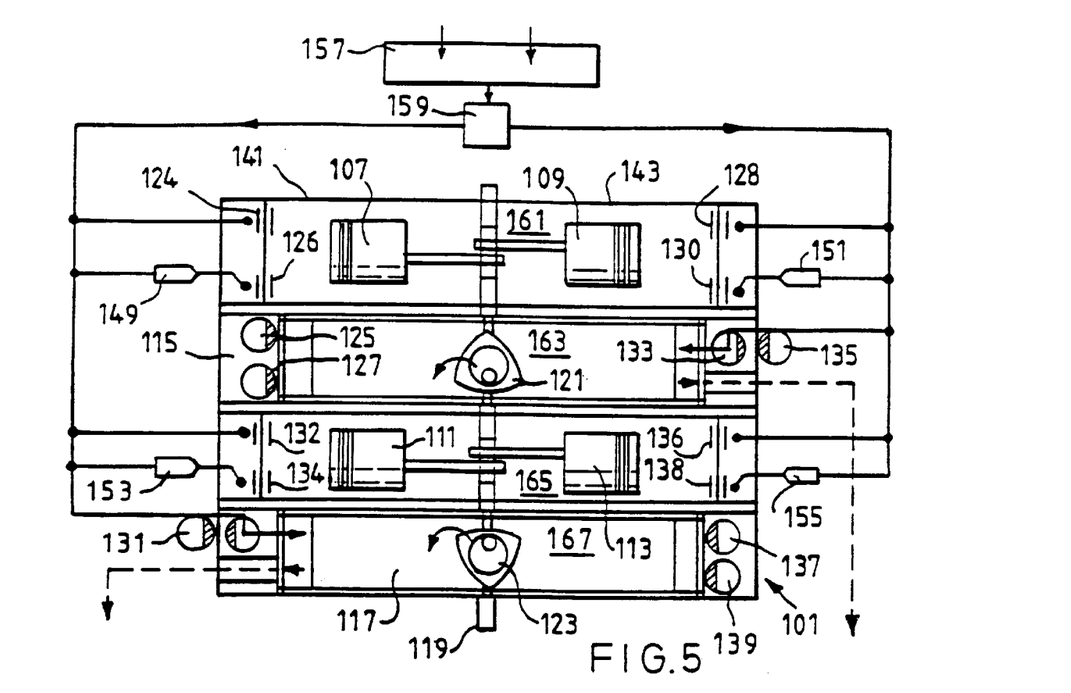
FIG. 5 shows the engine of FIG. 3 operating in a third mode.
Figure 8:
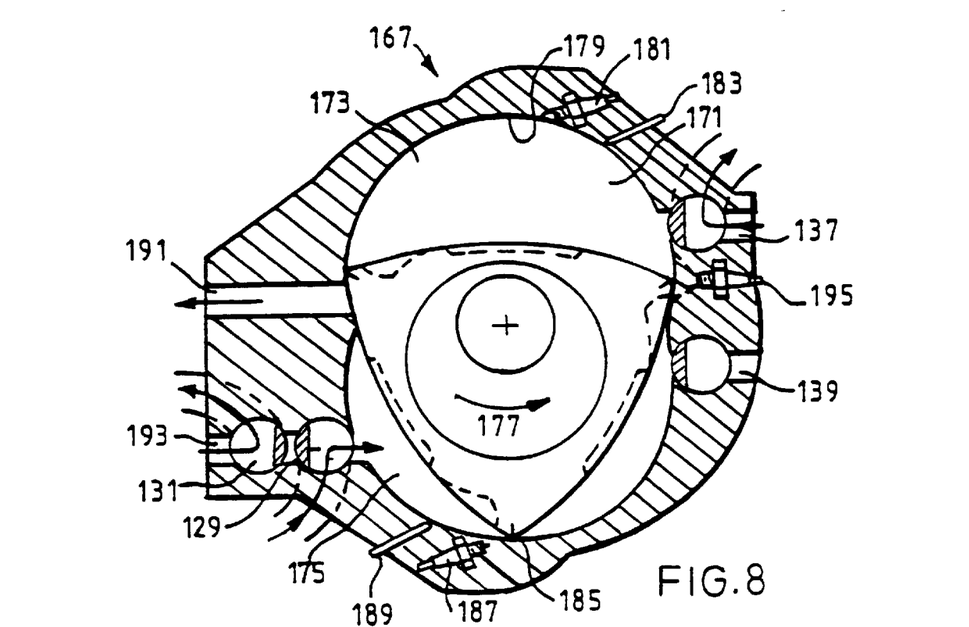
FIG. 8 shows the rotary unit of FIG. 7 with valves in an alternative configuration.

Mode "C" is explained by FIG. 5. This is a unique mode in which an alternative fuel may also be used, for example hydrogen or liquid methane. The reciprocating pistons of units 161 and 165 are shut down by the closure of the relevant trapvalves. At the same time rotary valves of units 163 and 167 are switched to independent operation mode as shown in the drawing. Fuel is supplied by a side duct as shown in FIG. 8 which explains a "scramble mode". This function is very much like a conventional hydrogen powered rotary engine. Afterburner operation and spark plugs are not used in this mode. If used in an automobile, this mode is best used for urban driving where one day use of fossil fuels may be banned.

If the binary engine is applied to propellor-driven aircraft, it can then be used as an emergency auxilliary backup power unit. If used in marine applications it can also be used as a standby power unit in case of main engine failure.

Figure 6:
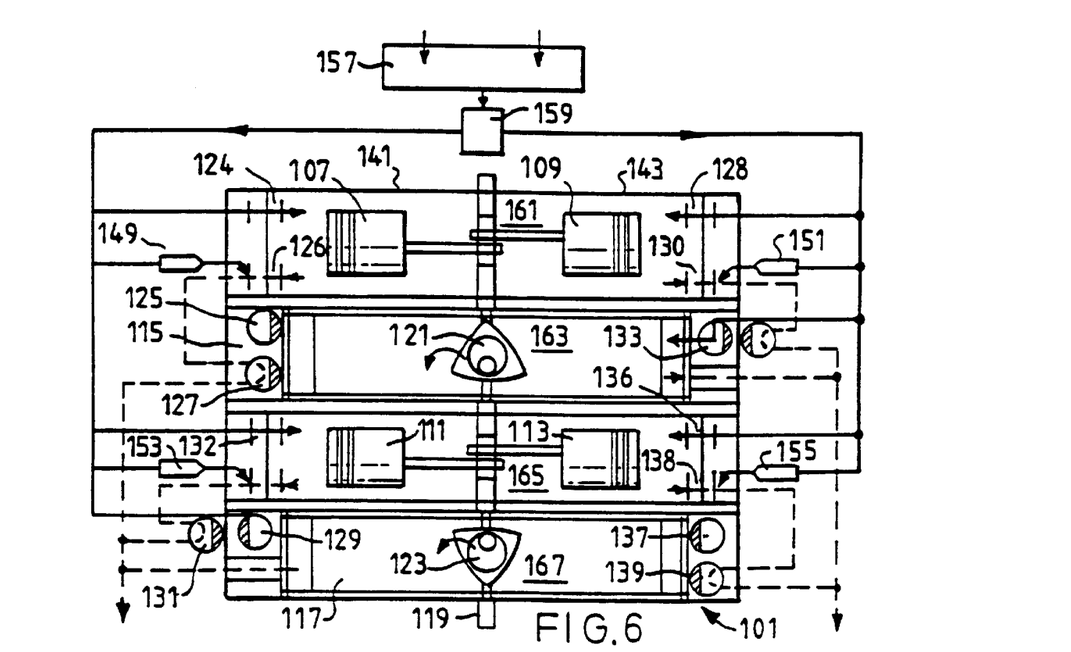
FIG. 6 shows the engine of FIG. 3 operating in a fourth mode.

Mode "D" is shown in FIG. 6. This is a mode in which all the reciprocating pistons and rotary pistons function independently and in unison. Exhaust gases which are now ducted out to the exhaust pipe directly will not be afterburnt. Power output in this mode is the highest because two basic engines are transmitting power to the same driveshaft together. This mode is very useful for towing heavy loads, very fast acceleration or for scrambling.

A special "idler mode" will now be described. To ensure that a safe level of clean emission from the binary engine is maintained if the application is in an automobile, the engine's idling operation is served only be hydrogen fuel while all the trap valves are closed. During idler mode the air injection system is utilised to supply enough air to the exhaust rotors where the afterburners will provide combustion within a predefined rpm range or speed before the reciprocating pistons cut in. In city traffic jams the binary engine emits pollution-free emissions. The limited range of engine revolutions allows the vehicle to move along in jams without having to burn fossil fuel. The idler mode will be overridden automatically when the engine is engaged in "Mode C" of operation.

In the idler mode, if there are two exhaust rotors in the engine, the light power needed to move along the vehicle can be controlled by varying the number of rotary compartment where combustion occurs. There are six instances where the rotor tips sweep past the afterburners in one crank revolution. Three is most preferred but six may be used when heavier loads are sensed within the idler engine speed range.

Figure 7:
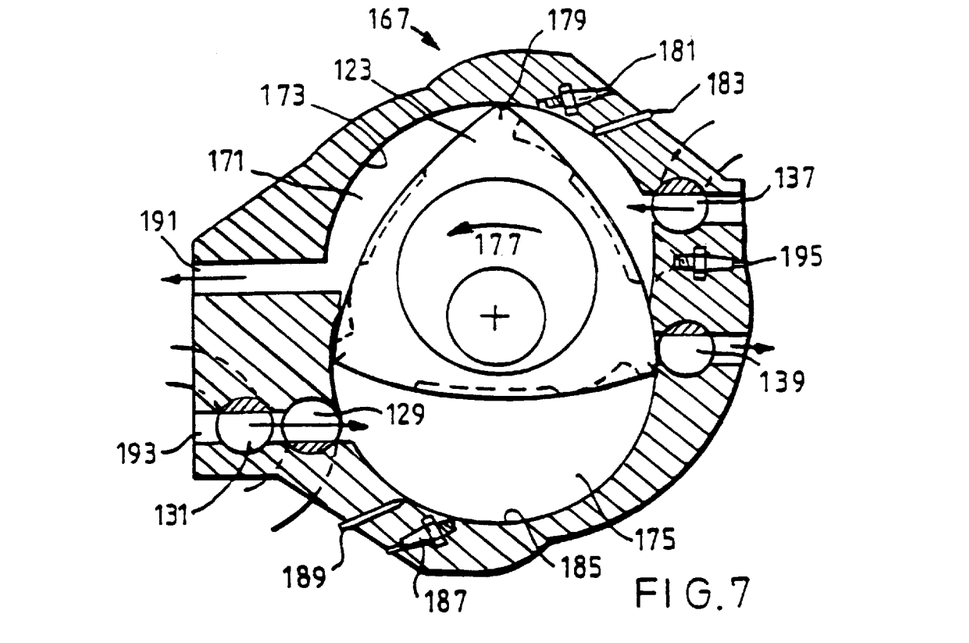
FIG. 7 shows the construction of a rotary unit having an afterburner, for use in an engine according to the present invention.

FIGS. 7 and 8 explain operation of the rotary units with optional afterburner function. Here, one of the rotary units 167 having rotor 123 is shown. However, this description also applies to the other unit 163 which has rotor 121. For the avoidance of doubt, it is hereby stated that this afterburner construction could be applied to the second rotary unit 5 which is downstream of the reciprocating unit 3 in the binary engine of the first embodiment or any analogous structure.

The rotary unit chamber 171 is divided into portion portion 173 and a lower portion 175. The rotor 123 moves counter-clockwise in the direction of the arrow 177. Between top-dead centre (TDC) 179 and the closest rotary valve 137 in the upper portion 173 is located a first afterburner spark plug 181 and, closer still to rotary valve 139, a first fuel jet 183.

In the lower portion 175, between bottom dead center (BDC) 185 and the closest rotary valve 129 is arranged a second afterburner spark plug 187 and closer still to the rotary valve 129, a second fuel jet 189. Obviously, the spark plugs 181, 187 and fuel jets 183, 189 are recessed so as not to impede the rotor.123.

As shown in FIG. 7, the rotor is receiving exhaust gas from reciprocating unit 165 and the afterburners (spark plug and fuel jet) are in operation. Exhaust from reciprocating unit 165 enters rotary valve 137. Orifice 191 in the upper portion 173, above rotary valve 129 is open, as are rotary valves 129,131. Cleansed emission is exhausted through valve 139 and orifice 191 in the upper and lower portions 173 and 175 respectively.

It should be noted that independent rotary power (i.e. independent of the afterburners) is optionally provided by a third recessed spark plug 195 between rotary valves 137 and 139.

FIG. 8 explains "scramble" mode whereby the rotary unit can operate independently as a rotary engine or in any other desired mode. Here, outlet 191 is open and rotary valves 129,131 in inlet 193 are closed. Valves 137,139 are also closed. Thus exhaust emission is effected through outlet 191 and not through the "clean" exhaust outlet which is obscured by valve 139. The exhaust gas from reciprocating unit is diverted direct to the exhaust pipe because it cannot enter through valves 131 and 137. The afterburners (181,183 and 187,189) are not in operation. Power is provided by ignition of the auxilliary third spark plug 195.

Figures 9A, 9B, 10:
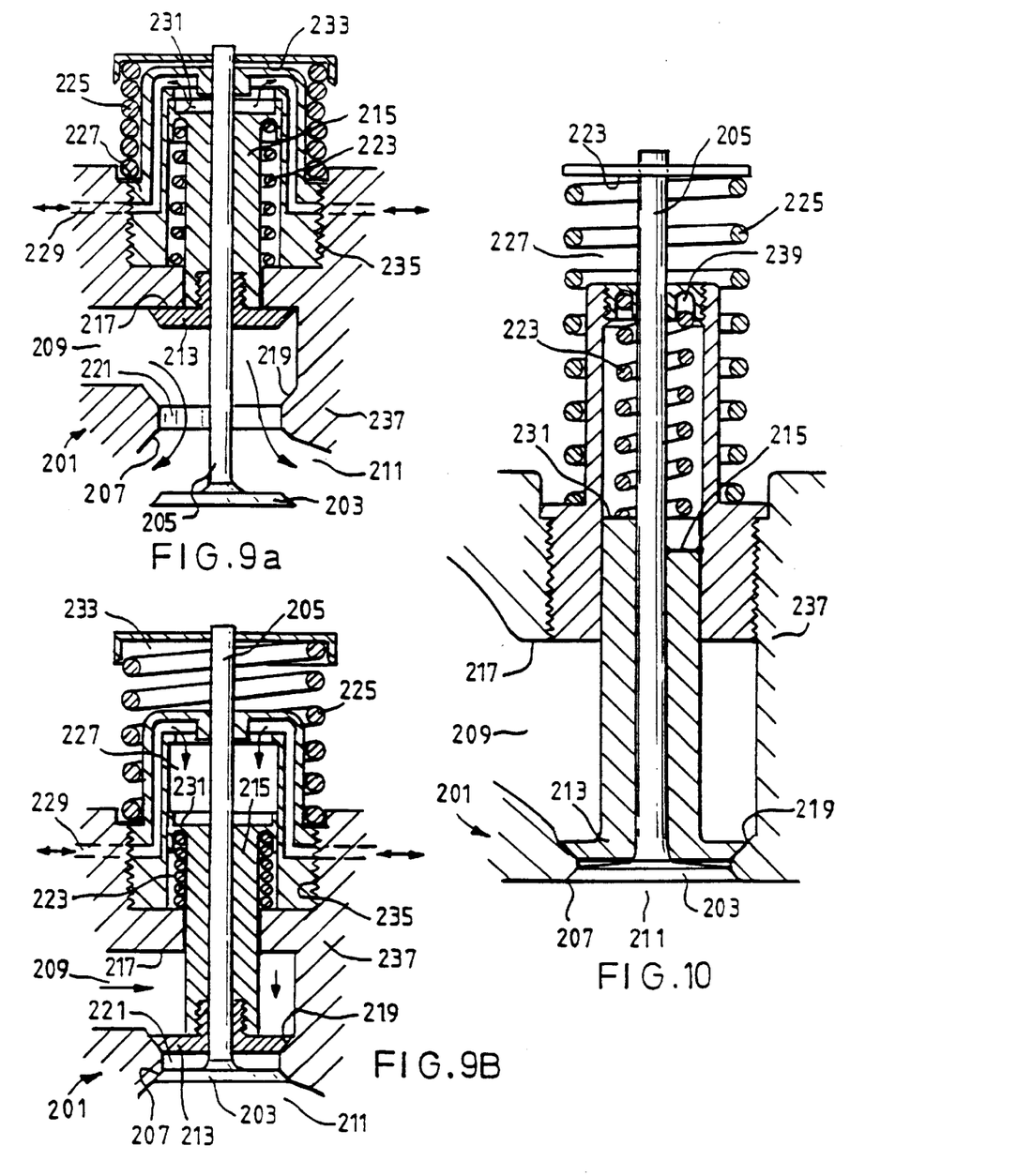
FIG. 9A shows details of a second form of trap valve at the inlet part of a reciprocating unit, when open
FIG. 9B shows the same trap valve when closed.
FIG. 10 shows a detail of the trap valve shown in FIGS. 9A and 9B.

FIGS. 9A and 9B show details of the construction of the inlet trap valves 201, etc., on the inlets of the reciprocating units 161,165. A primary valve member 203 connected to stem 205 seats on a primary seat 207 between an inlet port 209 and an outlet port 211. Above the main valve members is a secondary valve member 213 having a stem 215, both concentrically surrounding the stem 205 of the primary valve member 205.

The secondary valve member 213 moves between a stop surface 217 in the inlet port 209 and a secondary seat 219 directly over the main seat 207 so that both the primary and secondary valve members are capable of closing an orifice 221 between the inlet port 209 and the outlet port 211.

The secondary valve member is sprung on a second spring 223 surrounding the secondary valve stem and the primary valve member is sprung on a first spring 225 outside and concentric with the second spring 223. A cavity chamber 227 is defiled between the first and second springs, and communicates with a hydraulic line 229. Hydraulic fluid entering the cavity 227 can bear on an upper surface 231 of the secondary valve stem 215.

As shown in FIG. 9A, the first spring 225 is fully compressed and the primary valve member 203 is extended away from its seat 207 so that outlet port 211 is open. The second spring 223, which is weaker than the first spring 225, is relaxed. The secondary valve member 213 is retracted away from its seat 219 up against the abutment surface 217. Fresh air from the supercharger can enter the inlet port 209 to exit through the outlet port 211.

As shown in FIG. 9B, when the hydraulic line 229 is pressurised, hydraulic fluid bears down upon the upper surface 231 of the secondary valve stem 215. The secondary valve member 213 is thus forced downwardly away from the abutment surface 217 onto the seat 219, closing orifice 221. At the same time, the upper surface 231 of the cavity chamber 227 is forced upwardly by the pressure of second spring 223 so that the first spring 225 relaxes and the primary valve member 203 is forced against its seat 207 by camshaft action. Thus, the orifice 221 is closed and air cannot pass from the inlet port 209 to the outlet port 211. The main valve movements are governed by the overhead camshaft or rocker arm.

For convenience, the cavity chamber 227 with integral first 225 and second 223 springs and the valve members 203,213 and their stems 205,215, is screwed into a threaded recess 235 in the block 237. The mutual abutment surface of the valve systems 205,215 are preferably lubricated.

A detail of the valve shown in FIGS. 9A and 9B is illustrated in FIG. 10 which shows the valve in the closed position of FIG. 9B. The mounting thread is omitted from this drawing for clarity, as is the hydraulic line. For convenience, like reference numerals are used to denote the same features shown in FIGS. 9A and 9B and will not be described further here. However, FIG. 10 shows details of a spring tensioner 239 at the top of the second spring 223.

In the light of this disclosure, modifications of the described embodiment, as well as other embodiments, all within the scope of the appended claims, will now be apparent to persons skilled in the art.

I claim:

1. An internal combustion engine, comprising: at least one reciprocating unit which includes at least one reciprocating piston within a cylinder having an inlet and an exhaust and means for introducing a first type of fuel into the cylinder, and at least one rotary engine which includes a rotor within a housing having an inlet, the reciprocating unit and the rotary engine being coupled in series to a common drive such that the rotary engine is situated downstream of the exhaust of the reciprocating unit, the exhaust of the reciprocating unit being coupled to the inlet of the rotary engine, wherein the rotary engine is provided with afterburner means for burning exhaust fluids exhausted from the reciprocating unit, the afterburner means including means for adding a second fuel type to the exhaust gases.

2. An internal combustion engine according to claim 1, wherein said common drive is a crankshaft.

3. An internal combustion engine according to claim 1, wherein said common drive is a cam shaft.

4. An internal combustion engine according to claim 1, comprising a further rotary unit which includes a rotor within a housing coupled to the common drive.

5. An internal combustion engine according to claim 4, wherein the rotary engine and the further rotary unit are arranged respectively on either side of the reciprocating unit, with respect to the common drive.

6. An internal combustion engine according to claim 1, wherein ducting is provided to pass gas between the rotary engine and the reciprocating unit.

7. An internal combustion engine according to claim 5, wherein ducting is provided to pass gas between the rotary engines and the reciprocating unit.

8. An internal combustion engine according to claim 7, wherein the further rotary unit is structured and arranged to pass intake air to the reciprocating unit and the at least one rotary engine is structured and arranged to receive exhaust gas from the reciprocating unit.

9. An internal combustion engine according to claim 1, wherein the reciprocating unit is structured and arranged to provide combustion, while the at least one rotary engine is structured and arranged to only provide afterburning.

10. An internal combustion engine according to claim 8, wherein the reciprocating unit is structured and arranged to provide combustion, while the at least one rotary engine is structured and arranged to only provide afterburning and the further rotary unit is structured and arranged to only supply intake air to the reciprocating unit.

11. An internal combustion engine according to claim 1, wherein the reciprocating unit comprises at least three cylinders in radial formation.

12. An internal combustion engine according to claim 1, wherein at least two reciprocating units are arranged alternatively with the same number of rotary engines, relative to the common drive, each reciprocating unit including at least one reciprocating piston within a respective cylinder and each rotary engine including a rotor within a respective cylinder.

13. An internal combustion engine according to claim 12, wherein each of the reciprocating units is provided with a second piston located within a second cylinder.

14. An internal combustion engine according to claim 12, wherein an exhaust outlet of a reciprocating unit is provided with an air inlet before entry into a downstream rotary engine.

15. An internal combustion engine according to claim 1, wherein at least one trap valve is provided between the reciprocating unit and the rotary engine.

* * * * *